A. G. DAVIS.
METHOD AND APPARATUS FOR SAFEGUARDING NAVIGATION.
APPLICATION FILED DEC. 4, 1911.
1,166,331. Patented Dec. 28, 1915.
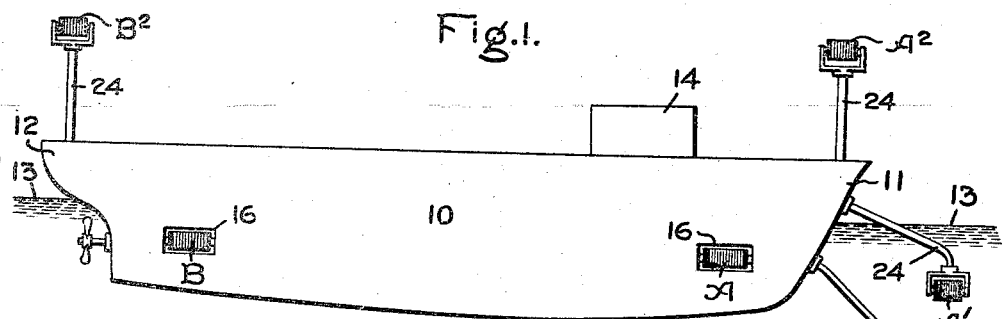
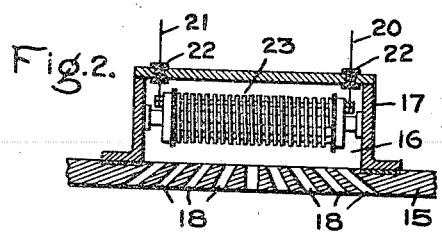
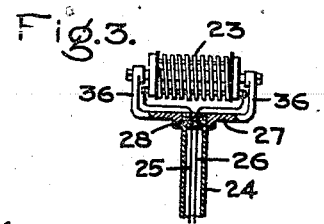
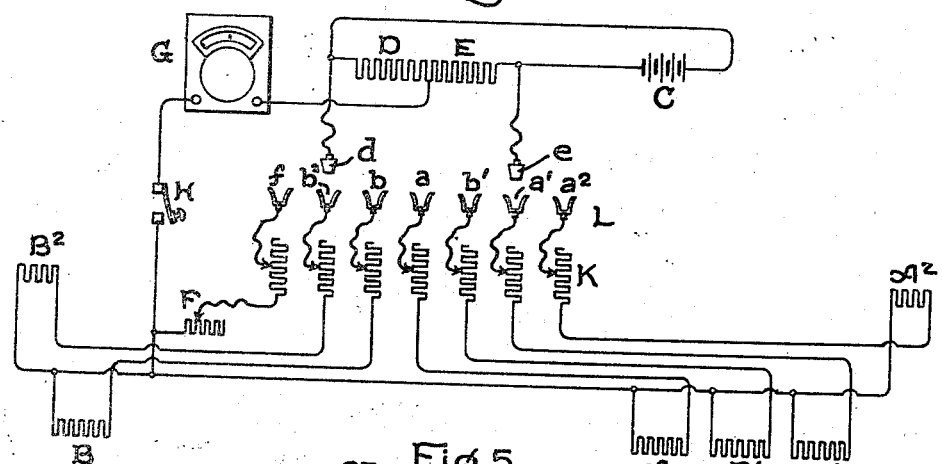
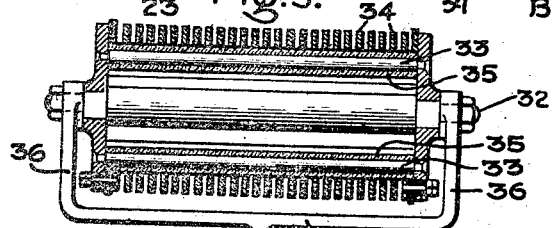
Witnesses: Inventor:

or # UNITED STATES PATENT OFFICE.

ALBERT G. DAVIS, OF SCHENECTADY, NEW YORK, ASSIGNOR TO GENERAL ELECTRIC COMPANY, A CORPORATION OF NEW YORK.

METHOD AND APPARATUS FOR SAFEGUARDING NAVIGATION.

1,166,331.　　　　Specification of Letters Patent.　　Patented Dec. 28, 1915.

Application filed December 4, 1911. Serial No. 663,737.

*To all whom it may concern:*

Be it known that I, ALBERT G. DAVIS, a citizen of the United States, residing at Schenectady, in the county of Schenectady and State of New York, have invented a certain new and useful Method and Apparatus for Safeguarding Navigation, of which the following is a specification, reference being made therein to the accompanying drawings.

The object of my invention is to provide means for detecting the presence of warm and cold currents and of other conditions which cause changes in temperature of air or water, and more particularly in detecting the proximity of icebergs and ice fields.

My invention consists in observing the temperature of air or water simultaneously at two or more points on or about the ship, and in providing means for accomplishing the same.

It is well known that the temperatures of the air and the water are useful indications in navigating parts of the ocean where icebergs are likely to be encountered, such as the region off the Newfoundland banks on the route of transatlantic travel. So far as I know the only method now in use is to take frequent readings by holding a thermometer in the water over the side of the ship. In the great length of a large steamship a difference between the temperature of the air or water at the bow and the temperature at the stern can be noted and by observing this difference it can be told whether the ship is passing into warmer or colder air or water. While it is not well understood just what effect the presence of an iceberg has on the temperature of the surrounding water, it is believed that the melting of the iceberg causes a film of cold water to spread over the surface of the ocean near it. In order to observe this effect I dispose means for observing the temperature, one near the surface of the water, and the other at a considerable depth, both of which should be disposed as far in advance of the prow of the vessel as possible in order to obtain the temperature of the water before the same is disturbed by the advance of the vessel.

In my preferred form of invention I use electric resistances as the means for observing the temperature, but I am aware that other means may be used, such as thermo-electric couples, or gas thermometers, and I consider the same to be fairly within the scope of my invention as set forth in the appended claims.

Referring now to the accompanying drawings in which like characters refer to like parts in the different figures, Figure 1 is a longitudinal view of a ship, equipped with my temperature observing means; Fig. 2 is a horizontal section of a portion of the ship's side, showing a recess in which said means may be attached; Fig. 3 is a view of a pipe upon which said means may be disposed; Fig. 4 is a wiring diagram, showing the electrical connections of my apparatus, and Fig. 5 is a detail of a resistance, in longitudinal section.

The ship 10 is provided with thermal resistances A, B disposed beneath the water line 13 near the bow 11 and stern 12 respectively in recesses 16 in the side 15. These resistances are used in determining the temperature of the water ahead and astern. The resistances $A^1$, $B^1$, are disposed on pipes 24 extending forwardly from the bow 11 near the surface, and at a considerable depth respectively. The resistances $A^2$, $B^2$, are disposed on upstanding pipes 24 at the bow 11 and stern 12 respectively for observing the temperature of the air. From each of these resistances, wires are led to the point of observation in the pilot house 14. The recess 16 is formed by fastening a flanged box 17 to the shell 15 of the ship. The shell 15 has cut in it at this point diagonally disposed vertical slots 18, for inward and outward currents of the water. Attached to the inside of the box 17 is the resistance coil 23, from which the wires 20, 21 are led through water tight insulating bushings 22. The pipes 24 have at the end a collar 27, to which is fastened resistance coil 23, from which the wires 25, 26 are led through the water tight insulating bushing 28 to the inside of the pipe.

The resistance coils 23 for the resistances A, B, $A^1$, $B^1$, $A^2$, and $B^2$ are wound to the same resistance out of any well known metal or alloy having a high temperature resistance coefficient. In the form of winding here shown the spaced turns 34 are wound upon a squirrel cage, having its longitudinal rods 33 covered with glass tubes 35, and being fastened by a bolt 32 running there-through to the upstanding arms 36 of the base of the collar 27.

From each of the resistances A, A¹, A², B, B¹, B² one wire leads to a common neutral passing through the galvanometer G of a Wheatstone bridge, and joined to the wire connecting the two resistances D and E of the bridge, which are wound equal, and have their outer terminals connected to the battery C, or other source of current. Also fastened to these terminals are the flexible jacks $d$ and $e$, provided with plugs to fit the sleeve terminals of the switchboard L. The other wire leading from each of the resistances A, A¹, A², B, B¹, B², runs through a small adjustable resistance K, and terminates in one of the corresponding sleeve terminals, $a$, $a^1$, $a^2$, $b$, $b^1$, $b^2$ of the switchboard L. The resistances K are provided to compensate for any slight difference in resistance of the circuits leading to the different resistances, and are permanently adjusted when the apparatus is installed. From the common neutral or galvanometer wire there is also run a wire leading through the adjustable resistance F to the terminal sleeve $f$ of the switchboard L. The resistances D, E, and F are made capable of delicate adjustment, as for instance, the coil and sliding finger type, and are made of metal or alloy having preferably a zero resistance temperature coefficient as are also the resistances K. The resistance F is adjusted so as to be equal to the resistance of one of the thermal resistances at some temperature arbitrarily selected as the normal, such as ten degrees centigrade.

The galvanometer G is preferably a millivoltmeter arranged to give both positive and negative readings, and is provided with the depressible key H to protect it from the inductive kick of the apparatus.

The manner of using my apparatus is as follows: The observer in the pilot house wishing to note the difference in temperature between two points, as A and B, will place the jacks $d$ and $e$ in the sleeves $a$ and $b$ respectively, and press the key H, causing the galvanometer to deflect in one direction or the other, the amount of the deflection indicating the difference in temperature, and the calibration marks of the instrument being arranged to indicate degrees of temperature. To determine the actual temperature at one point the observer will place one jack in sleeve $f$ and the other in the sleeve corresponding to the point to be observed, and the deflection will then indicate the difference between the temperature at the point and the arbitrary normal, such as 10 degrees C., to which resistance F is adjusted.

It is obvious that the bridge is most sensitive when resistance D and E are equal. Should the difference be so great that the galvanometer goes off scale, the resistance D and E can be adjusted in a certain ratio giving a constant by which the reading must be multiplied.

For ordinary steaming it is believed that the apparatus should be plugged so as to indicate continuously the difference in temperature between A and B, and that when any marked difference is noted all the points should be observed.

It is obvious that there are many modifications of my invention possible, and I aim in the appended claims to cover all modifications which do not depart from the spirit and scope of my invention.

What I claim as new, and desire to secure by Letters Patent of the United States, is:—

1. The method of safeguarding navigation which consists in producing at a common point a direct indication of the difference in temperature of two different points in air or water about a ship, said two different points being so related with respect to the ship that a change in the normal difference in temperature of the air or water at these points is indicative of the presence of ice near the ship.

2. The method of safeguarding navigation which consists in continuously indicating at a common point the difference in temperature of two different points in air or water about a ship, said two different points being so related with respect to the ship that a change in the normal difference in temperature of the air or water at these points is indicative of the presence of ice near the ship.

3. The method of safeguarding navigation which consists in observing at a common point on a ship the difference in temperature of two different points in air or water about the ship, said two different points being so related with respect to the ship that a change in the normal difference in temperature of the air or water at these points is indicative of the presence of ice near the ship.

4. Apparatus for safeguarding navigation comprising in combination a plurality of thermo-sensitive means disposed at such points in air or water about a ship that a change in the normal difference in temperature of the air or water at two of the points is indicative of the presence of ice near the ship, each of said thermo-sensitive means being adapted to freely respond to changes in the thermal condition of the air or water surrounding such means, and means located at a common point on the ship for determining the difference in temperature of any two of said thermo-sensitive means.

5. Apparatus for safeguarding navigation comprising in combination two thermo-sensitive means disposed at such points in air or water about a ship that a change in the normal difference in temperature of the air or water at these points is indicative of the presence of ice near the ship, each of said thermo-sensitive means being adapted to freely respond to the thermal condition of the air or water surrounding such means, and electrical means for directly indicating at a common point the difference in temperature of said thermo-sensitive means.

6. Apparatus for safeguarding navigation comprising in combination two thermo-sensitive means disposed at such points in air or water about a ship that a change in the normal difference in temperature of the air or water at these points is indicative of the presence of ice near the ship, each of said thermo-sensitive means being adapted to freely respond to changes in the thermal condition of the air or water surrounding such means, conductors for electrically connecting each of said thermo-sensitive means to a common point, and electrical means located at said common point for directly indicating the difference in temperature of said thermo-sensitive means.

7. Apparatus for safeguarding navigation comprising in combination two thermo-sensitive means disposed at different points in air or water about a ship, each of said thermo-sensitive means being adapted to freely respond to changes in the thermal condition of the air or water surrounding such means and said two different points at which said thermo-sensitive means are disposed being so related with respect to the ship that a change in the normal difference in temperature of the air or water at these points is indicative of the presence of ice near the ship, and means located at a common point on the ship for continuously producing a direct indication of the difference in temperature of said thermo-sensitive means.

8. Apparatus for safeguarding navigation comprising in combination a plurality of electrical thermo-sensitive means disposed at different points in air or water about a ship, each of said thermo-sensitive means being adapted to freely respond to changes in the thermal condition of the air or water surrounding such means and the points at which said thermo-sensitive means are disposed being so related with respect to the ship that a change in the normal difference in temperature of the air or water at two of these points is indicative of the presence of ice near the ship, conductors for electrically connecting each of said thermo-sensitive means to a common point on the ship, a standard electrical thermo-sensitive means at said common point, and means located at said common point whereby any of the thermo-sensitive means can be compared with the standard thermo-sensitive means or with each other.

9. In an apparatus of the class described, the combination of a plurality of electrical resistances sensitive to temperature, disposed at different points in air or water about the ship, a standard resistance not subject to changes of temperature, circuits of equal resistance leading to each of said resistances, one wire being connected to the galvanometer of a Wheatstone bridge, and the other wire to a switchboard terminal, a Wheatstone bridge comprising two resistances and a jack at the end of each resistance to be inserted in said switchboard terminal whereby any two of said first named resistances or the standard resistance may be connected into said bridge for comparison with each other.

10. In an apparatus of the class described, a shell forming a recess in the side of the ship below the water line, means sensitive to temperature within the shell, and a cover for said recess provided with diagonally disposed slots for causing the water to flow into and out of said recess with the advance of the ship.

In witness whereof, I have hereunto set my hand this second day of December, 1911.

ALBERT G. DAVIS.

Witnesses:
BENJAMIN B. HULL,
HELEN ORFORD.